(12) United States Patent
Xie

(10) Patent No.: US 11,388,220 B2
(45) Date of Patent: Jul. 12, 2022

(54) IMAGE DISTRIBUTION METHOD AND APPARATUS, AND IMAGE OBTAINING METHOD AND APPARATUS

(71) Applicant: Huawei Technologies Co., Ltd., Shenzhen (CN)

(72) Inventor: Keyang Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 16/589,729

(22) Filed: Oct. 1, 2019

(65) Prior Publication Data

US 2020/0036772 A1 Jan. 30, 2020

Related U.S. Application Data

(63) Continuation of application No. PCT/CN2018/080944, filed on Mar. 28, 2018.

(30) Foreign Application Priority Data

Apr. 1, 2017 (CN) .......................... 201710214053.7

(51) Int. Cl.
*H04L 67/06* (2022.01)
*G06F 16/583* (2019.01)
*H04L 9/32* (2006.01)

(52) U.S. Cl.
CPC ............ *H04L 67/06* (2013.01); *G06F 16/583* (2019.01); *H04L 9/3236* (2013.01); *H04L 9/3297* (2013.01); *H04L 2209/38* (2013.01)

(58) Field of Classification Search
CPC ..... H04L 67/06; H04L 9/3236; H04L 9/3297; H04L 2209/38; G06F 16/583
See application file for complete search history.

(56) References Cited

U.S. PATENT DOCUMENTS 8,606,846 B2 * 12/2013 Czechowski, III ........................ H04L 67/1076 709/201
8,863,125 B2 * 10/2014 Ciano ................. G06F 9/45558 718/1

(Continued)

FOREIGN PATENT DOCUMENTS

| CN | 102307210 A | 1/2012 |
|----|-------------|--------|
| CN | 103186554 A | 7/2013 |

(Continued)

OTHER PUBLICATIONS

KR101620219 (B1)—Virtual Machine Image Distribution Method, Downloading Method and Apparatus Using Duplication Based P2P (Year: 2016).*

(Continued)

*Primary Examiner* — Sm A Rahman
(74) *Attorney, Agent, or Firm* — Conley Rose, P.C.

(57) ABSTRACT

A method and apparatus pertaining to the field of network technologies include generating interplanetary file system (IPFS) metadata of a first image and an IPFS metadata identifier of the first image based on pieces of block data of the first image, storing the pieces of block data of the first image to storage locations corresponding to the address information in an IPFS repository of the node device, and adding the IPFS metadata identifier of the first image to a distributed hash table (DHT) of a distributed file system. A node device is configured to locally construct and store the image without depending on a central repository server, and publish the image by adding the IPFS metadata identifier corresponding to the IPFS metadata of the image to the DHT to enable another node device to obtain the image based on the DHT.

14 Claims, 10 Drawing Sheets

(56) References Cited

U.S. PATENT DOCUMENTS

| | | | |
|---|---|---|---|
| 9,819,972 B1* | 11/2017 | Vantalon | H04N 21/643 |
| 9,942,578 B1* | 4/2018 | Vantalon | H04N 21/4302 |
| 9,961,139 B2* | 5/2018 | Kaguma | H04L 67/1093 |
| 10,305,721 B1* | 5/2019 | Binns | H04N 21/632 |
| 2008/0155191 A1 | 6/2008 | Anderson et al. | |
| 2009/0138480 A1* | 5/2009 | Chatley | G06F 16/185 |
| 2011/0161668 A1* | 6/2011 | Sentinelli | H04L 63/12 |
| | | | 713/168 |
| 2011/0311051 A1* | 12/2011 | Resch | H04W 12/0431 |
| | | | 380/47 |
| 2013/0304706 A1* | 11/2013 | MacInnis | H04L 67/1097 |
| | | | 707/658 |
| 2016/0323237 A1 | 11/2016 | Warfield et al. | |
| 2016/0357972 A1 | 12/2016 | Stuntebeck et al. | |
| 2017/0085637 A1 | 3/2017 | Cencini et al. | |

FOREIGN PATENT DOCUMENTS

| | | |
|---|---|---|
| CN | 104885076 A | 9/2015 |
| CN | 106506587 A | 3/2017 |

OTHER PUBLICATIONS

Bibliographic data: KR101620219 (B1)—May 11, 2016 (Year: 2016).*

Machine Translation and Abstract of Chinese Publication No. CN102307210, Jan. 4, 2012, 19 pages.

Foreign Communication From A Counterpart Application, Chinese Application No. 2017102140537, Chinese Search Report dated Jan. 19, 2020, 2 pages.

Foreign Communication From A Counterpart Application, Chinese Application No. 2017102140537, Chinese Office Action dated Feb. 3, 2020, 7 pages.

Machine Translation and Abstract of Chinese Publication No. CN103186554, Jul. 3, 2013, 20 pages.

Machine Translation and Abstract of Chinese Publication No. CN106506587, Mar. 15, 2017, 19 pages.

Dongfang, Z., et al., "HyCache+: Towards Scalable High-Performance Caching Middleware for Parallel File Systems," XP032614501, 14th IEEE/ACM International Symposium on Cluster, Cloud and Grid Computing, IEEE, May 26, 2014, pp. 267-276.

Foreign Communication From A Counterpart Application, European Application No. 18777174.6, Extended European Search Report dated Dec. 10, 2019, 9 pages.

Foreign Communication From A Counterpart Application, PCT Application No. PCT/CN2018/080944, English Translation of International Search Report dated Jun. 15, 2018, 2 pages.

Foreign Communication From A Counterpart Application, PCT Application No. PCT/CN2018/080944, English Translation of Written Opinion dated Jun. 15, 2018, 4 pages.

* cited by examiner

US 11,388,220 B2

IMAGE DISTRIBUTION METHOD AND APPARATUS, AND IMAGE OBTAINING METHOD AND APPARATUS

CROSS-REFERENCE TO RELATED APPLICATIONS

This application is a continuation of International Patent Application No. PCT/CN2018/080944 filed on Mar. 28, 2018, which claims priority to Chinese Patent Application No. 201710214053.7 filed on Apr. 1, 2017. The disclosures of the aforementioned applications are hereby incorporated by reference in their entireties.

TECHNICAL FIELD

The present disclosure relates to the field of network technologies, and in particular, to an image distribution method and apparatus, and an image obtaining method and apparatus.

BACKGROUND

A distributed file system is a system capable of managing mass data. The distributed file system may deploy an application for a plurality of node devices in the system. To implement normal running of the application on the node device, the distributed file system may construct a container on each node device. As a lightweight virtual machine, a container can provide an isolated running environment to an application. In a process of constructing a container, the distributed file system needs to distribute a set of user mode files that are required by running of the container, that is, distribute images of the container.

A current distributed file system includes a central repository server that provides an image storage service, a controller, a tracer, a plurality of node device agents, and a plurality of node devices. The controller is configured to exchange data with the central repository server and manage the plurality of node device agents for image distribution. The tracer is configured to trace an image download status of each node device. Each node device agent corresponds to a node device, and manages image download of the corresponding node device. Based on this protocol, the image distribution process includes the following.

After the controller receives an image distribution task, the controller downloads, by layers, an image from a central repository server to a local image repository of the controller, and delivers, to each node device agent, an image download task. After receiving the download task, the node device agent checks, by invoking the tracer for each image layer of the image, whether the image layer does not exist in all the node devices. If yes, the node device agent invokes the node device managed by the node device agent to download the image layer from the local image repository of the controller. If not, the node device agent may invoke the node device to download the image layer from a node device that has already stored the image layer. After the download is complete, the node device may be used as a distribution node device to provide download of the image layer for another node device.

In a process of implementing the present disclosure, the inventor finds at least the following problems.

In the foregoing technology, an image needs to be downloaded from the central repository server using the controller and then distributed to each node device, and image distribution of the plurality of node devices needs to be implemented through multi-layer control of the controller and the node device agents, causing low distribution efficiency.

SUMMARY

Embodiments of the present disclosure provide an image distribution method and apparatus, and an image obtaining method and apparatus, to resolve a problem of low distribution efficiency. The technical solutions are as follows.

According to a first aspect, an image distribution method is provided. The method includes generating interplanetary file system (IPFS) metadata of a first image and an IPFS metadata identifier of the first image based on a plurality of pieces of block data of the first image, where the IPFS metadata of the first image includes an image identifier of the first image, a name of the node device, and names and address information of the plurality of pieces of block data of the first image, and the IPFS metadata identifier of the first image is used to index the IPFS metadata of the first image, storing the plurality of pieces of block data of the first image to storage locations that correspond to the address information and that are in an IPFS repository of the node device, and adding the IPFS metadata identifier of the first image to a distributed hash table (DHT) of a distributed file system, where the DHT includes IPFS metadata identifiers of images published by a plurality of node devices in the distributed file system.

According to the method provided in this embodiment of the present disclosure, the node device may locally construct and store the image without depending on a central repository server, then generate the IPFS metadata identifier corresponding to the IPFS metadata of the image based on the plurality of pieces of block data of the image, and publish the image by adding the IPFS metadata identifier to the DHT such that another node device may obtain the image based on the DHT. The entire process may be performed between node devices without control of another device such that efficiency is high.

In a first possible implementation of the first aspect, adding the IPFS metadata identifier of the first image to a DHT includes receiving a publication request for the first image, where the publication request carries the image identifier of the first image, and obtaining the IPFS metadata identifier of the first image based on the image identifier of the first image, and adding the IPFS metadata identifier of the first image to the DHT.

According to the method provided in this embodiment of the present disclosure, the node device may obtain, based on the image identifier of the first image that is carried in the publication request, the IPFS metadata identifier corresponding to the IPFS metadata of the first image, and publishes the first image by adding the IPFS metadata identifier to the DHT. The node device only needs to add the IPFS metadata identifier of the first image to the DHT without publishing the block data of the first image such that a volume of transmitted image data can be reduced and storage space utilization can be improved, thereby reducing overheads of an entire system.

In a second possible implementation of the first aspect, the IPFS metadata of the first image further includes version information of the first image, and storing the plurality of pieces of block data of the first image to storage locations that correspond to the address information and that are in an IPFS repository of the node device includes determining, based on the image identifier of the first image, whether a second image exists in the IPFS repository of the node device, where an image identifier of the second image is the same as the image identifier of the first image, and storing the plurality of pieces of block data of the first image to the storage locations that correspond to the address information and that are in the IPFS repository of the node device if the second image exists and version information of the second image is different from the version information of the first image.

According to the method provided in this embodiment of the present disclosure, the node device may store a first image of a new version to the IPFS repository of the node device, thereby updating a version of an image having a same name as the first image of the new version.

In a third possible implementation of the first aspect, generating an IPFS metadata identifier of the first image includes performing image service-customized encoding and hash encoding on the image identifier of the first image to obtain the IPFS metadata identifier of the first image.

According to the method provided in this embodiment of the present disclosure, the node device may generate the IPFS metadata identifier of the first image through the image service-customized encoding and the hash encoding such that a manner of generating the IPFS metadata identifier is provided.

According to a second aspect, an image obtaining method is provided. The method includes receiving a request for obtaining a first image, where the obtaining request carries an image identifier of the first image, determining, based on the image identifier of the first image, whether an IPFS metadata identifier of the first image exists in a DHT, where the DHT includes IPFS metadata identifiers of images published by a plurality of node devices in a distributed file system, and the IPFS metadata identifier of the first image is used to index IPFS metadata of the first image, obtaining the IPFS metadata corresponding to the IPFS metadata identifier of the first image if the IPFS metadata identifier of the first image exists, and obtaining the first image based on the IPFS metadata of the first image.

According to the method provided in this embodiment of the present disclosure, the node device may proactively initiate the request for obtaining the first image, obtain, based on the DHT, the IPFS metadata corresponding to the IPFS metadata identifier of the first image, and obtain, based on the IPFS metadata, the first image to the node device from a node device that publishes the first image. The obtaining of the image may be triggered by proactively initiating the obtaining request by the node device, and the obtaining of the image may be performed between node devices without control of another device such that efficiency is high.

In a first possible implementation of the second aspect, determining, based on the image identifier of the first image, whether an IPFS metadata identifier of the first image exists in a DHT includes performing image service-customized encoding and hash encoding on the image identifier of the first image, to obtain the IPFS metadata identifier of the first image, and determining whether the IPFS metadata identifier of the first image exists in the DHT.

According to the method provided in this embodiment of the present disclosure, the node device may obtain the IPFS metadata identifier of the first image through the hash encoding and the image service-customized encoding, to determine whether the IPFS metadata identifier of the first image exists in the DHT such that a manner of determining, based on the image identifier of the first image, whether the IPFS metadata identifier of the first image exists in the DHT is provided.

In a second possible implementation of the second aspect, the obtaining the IPFS metadata corresponding to the IPFS metadata identifier of the first image includes sending an obtaining request to the DHT, where the obtaining request is used to obtain the IPFS metadata corresponding to the IPFS metadata identifier of the first image such that the DHT queries and obtains the IPFS metadata of the first image from the plurality of node devices in the distributed file system, and receiving a request result returned by the DHT, where the request result carries the IPFS metadata of the first image.

According to the method provided in this embodiment of the present disclosure, the node device may send the obtaining request to the DHT based on the IPFS metadata identifier of the first image, and the DHT returns the IPFS metadata corresponding to the IPFS metadata identifier of the first image such that a manner of obtaining the IPFS metadata based on the IPFS metadata identifier is provided.

In a third possible implementation of the second aspect, obtaining the first image based on the IPFS metadata of the first image includes obtaining, based on a name of a node device in which the first image is located and address information of a plurality of pieces of block data of the first image, the plurality of pieces of block data of the first image from the node device in which the first image is located, where the name and the address information are included in the IPFS metadata of the first image, and obtaining the first image based on the plurality of pieces of block data of the first image, or determining target block data based on names of a plurality of pieces of block data of the first image that are included in the IPFS metadata of the first image, obtaining, based on a name of a node device in which the first image is located and address information of the target block data that are included in the IPFS metadata of the first image, the target block data from the node device in which the first image is located, and obtaining the first image based on the target block data and block data of the first image that exists in an IPFS repository of the node device, where the target block data is block data that is in the plurality of pieces of block data of the first image and that does not exist in the IPFS repository of the node device.

According to the method provided in this embodiment of the present disclosure, the node device may obtain all block data of the first image from another node device based on the IPFS metadata of the first image, and obtain the entire first image based on all the block data, or may obtain a part of block data of the first image from another node device, and obtain the entire first image based on the part of the block data and the other part of the block data that has already been stored in the node device such that a plurality of manners of obtaining the first image based on the IPFS metadata of the first image are provided.

According to a third aspect, an image distribution apparatus is provided. The apparatus includes a plurality of functional modules, and the plurality of functional modules is configured to perform the image distribution method according to the first aspect and any possible implementation of the image distribution method.

According to a fourth aspect, an image obtaining apparatus is provided. The apparatus includes a plurality of functional modules, and the plurality of functional modules is configured to perform the image obtaining method according to the second aspect and any possible implementation of the image obtaining method.

According to a fifth aspect, a node device is provided. The node device includes a processor, and a memory configured to store an instruction executable for the processor, and the executable instruction is used to perform the following operations generating IPFS metadata of a first image and an IPFS metadata identifier of the first image based on a plurality of pieces of block data of the first image, where the IPFS metadata of the first image includes an image identifier of the first image, a name of the node device, and names and address information of the plurality of pieces of block data of the first image, and the IPFS metadata identifier of the first image is used to index the IPFS metadata of the first image, storing the plurality of pieces of block data of the first image to storage locations that correspond to the address information and that are in an IPFS repository of the node device, and adding the IPFS metadata identifier of the first image to a DHT of a distributed file system, where the DHT includes IPFS metadata identifiers of images published by a plurality of node devices in the distributed file system.

In a possible implementation, the executable instruction is used to perform the following operations of receiving a publication request for the first image, where the publication request carries the image identifier of the first image, obtaining the IPFS metadata identifier of the first image based on the image identifier of the first image, and adding the IPFS metadata identifier of the first image to the DHT.

In a possible implementation, the executable instruction is used to perform the following operations of determining, based on the image identifier of the first image, whether a second image exists in the IPFS repository of the node device, where an image identifier of the second image is the same as the image identifier of the first image, and storing the plurality of pieces of block data of the first image to the storage locations that correspond to the address information and that are in the IPFS repository of the node device if the second image exists and version information of the second image is different from the version information of the first image.

In a possible implementation, the executable instruction is used to perform the following operations of performing image service-customized encoding and hash encoding on the image identifier of the first image to obtain the IPFS metadata identifier of the first image.

According to a sixth aspect, a node device is provided. The node device includes a processor, and a memory configured to store an instruction executable for the processor, and the executable instruction is used to perform the following operations of receiving a request for obtaining a first image, where the obtaining request carries an image identifier of the first image, determining, based on the image identifier of the first image, whether an IPFS metadata identifier of the first image exists in a DHT, where the DHT includes IPFS metadata identifiers of images published by a plurality of node devices in a distributed file system, and the IPFS metadata identifier of the first image is used to index IPFS metadata of the first image, and obtaining the IPFS metadata corresponding to the IPFS metadata identifier of the first image if the IPFS metadata identifier of the first image exists, and obtaining the first image based on the IPFS metadata of the first image.

In a possible implementation, image service-customized encoding and hash encoding are performed on the image identifier of the first image, to obtain the IPFS metadata identifier of the first image, and whether the IPFS metadata identifier of the first image exists in the DHT is determined.

In a possible implementation, the executable instruction is used to perform the following operations of sending an obtaining request to the DHT, where the obtaining request is used to obtain the IPFS metadata corresponding to the IPFS metadata identifier of the first image such that the DHT queries and obtains the IPFS metadata of the first image from the plurality of node devices in the distributed file system, and receiving a request result returned by the DHT, where the request result carries the IPFS metadata of the first image.

In a possible implementation, the executable instruction is used to perform the following operations of obtaining, based on a name of a node device in which the first image is located and address information of a plurality of pieces of block data of the first image, the plurality of pieces of block data of the first image from the node device in which the first image is located, where the name and the address information are included in the IPFS metadata of the first image, and obtaining the first image based on the plurality of pieces of block data of the first image, or determining target block data based on names of a plurality of pieces of block data of the first image that are included in the IPFS metadata of the first image, obtaining, based on a name of a node device in which the first image is located and address information of the target block data that are included in the IPFS metadata of the first image, the target block data from the node device in which the first image is located, and obtaining the first image based on the target block data and block data of the first image that exists in an IPFS repository of the node device, where the target block data is block data that is in the plurality of pieces of block data of the first image and that does not exist in the IPFS repository of the node device.

According to a seventh aspect, a computer readable storage medium is provided. The computer readable storage medium stores an executable instruction, and the executable instruction is loaded and executed by a processor to implement the image distribution method according to the first aspect or any possible implementation of the first aspect.

According to an eighth aspect, a computer readable storage medium is provided. The computer readable storage medium stores an executable instruction, and the executable instruction is loaded and executed by a processor to implement the image obtaining method according to the second aspect or any possible implementation of the second aspect.

DESCRIPTION OF EMBODIMENTS

To make the objectives, technical solutions, and advantages of the present disclosure clearer, the following further describes the implementations of the present disclosure in detail with reference to the accompanying drawings.

Figure 1:
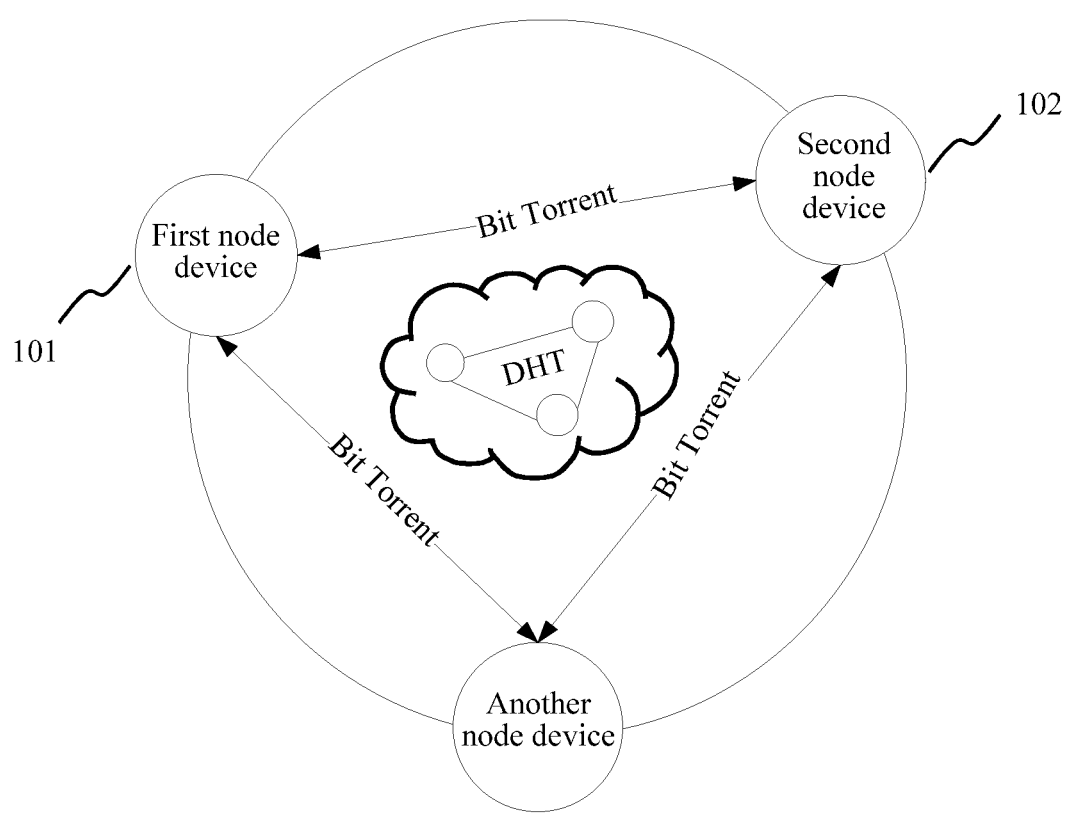
FIG. 1 is a schematic structural diagram of a distributed file system according to an embodiment of the present disclosure.

FIG. 1 is a schematic structural diagram of a distributed file system according to an embodiment of the present disclosure. Referring to FIG. 1, the distributed file system includes at least two node devices, for example, a first node device 101 and a second node device 102. The terms "first" and "second" are merely used for description, and are not intended to indicate relative importance of node devices. Actually, positions of node devices are the same, that is, the node devices may implement a same function. All the node devices in the distributed file system comply with the Bit Torrent Protocol together, and implement data transmission between the node devices based on the Bit Torrent Protocol.

Figure 2:
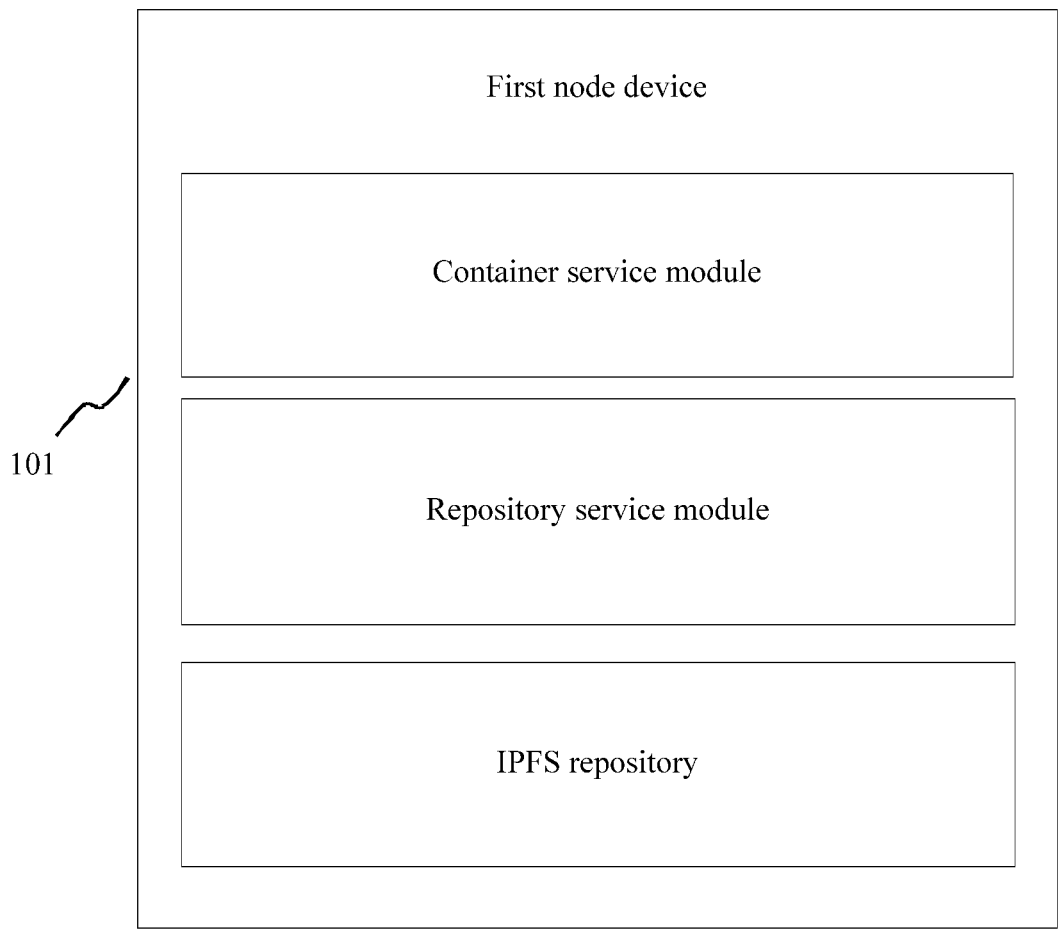
FIG. 2 is a schematic structural diagram of a node device 101 according to an embodiment of the present disclosure.

Any node device in the distributed file system may be implemented by a physical device such as a computer, a mobile terminal, or a server. Each node device may include a plurality of functional modules to provide a plurality of services. Using the first node device 101 as an example, referring to FIG. 2, the first node device 101 may include a container service module, a repository service module, and an IPFS repository.

The container service module may construct an image and provide a container service, for example, initiate a service request, including an image data storage request, an image publication request, and an image obtaining request. The repository service module may undertake a service of the container service module, and provide an image repository service using an IPFS, for example, receive and process the service request initiated by the container service module. An IPFS repository may provide an IPFS service, including a distributed storage service and a distribution service, for example, store image data, including metadata and block data of an image.

The container service module, the repository service module, and the IPFS repository may communicate with each other using a request. For example, the request may be a Hypertext Transfer Protocol (HTTP) request.

In the following embodiment of the present disclosure, a step performed by a node device may be actually performed by one functional module of the node device or cooperatively performed by a plurality of functional modules of the node device. A specific situation is described in steps of a subsequent embodiment.

Figure 3:
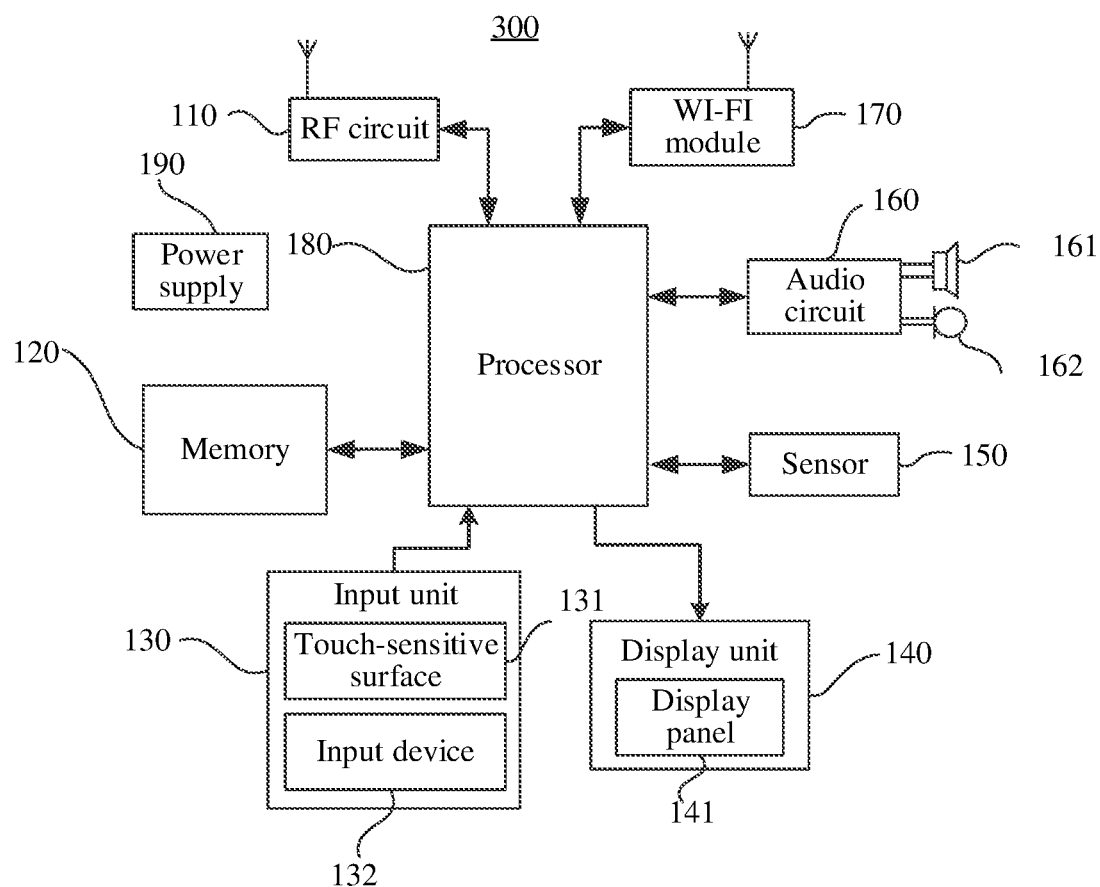
FIG. 3 is a schematic structural diagram of a node device 300 according to an embodiment of the present disclosure.

FIG. 3 is a schematic structural diagram of a node device 300 according to an embodiment of the present disclosure. The node device may be configured to perform an image distribution method provided in the following embodiments. Referring to FIG. 3, the node device 300 includes the following.

The node device 300 may include components such as a radio frequency (RF) circuit 110, a memory 120 including one or more computer readable storage media, an input unit 130, a display unit 140, a sensor 150, an audio circuit 160, a WI-FI module 170, a processor 180 including one or more processing cores, and a power supply 190. A person skilled in the art may understand that, a structure of the node device 300 shown in FIG. 3 does not constitute a limitation to the node device 300. The node device 300 may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the one or more processors 180 for processing, and sends related uplink data to the base station. Usually, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device through wireless communication. The wireless communication may use any communication standard or protocol, which includes, but is not limited to, Global System for Mobile Communications (GSM), General Packet Radio Service (GPRS), Code Division Multiple Access (CDMA), Wideband CDMA (WCDMA), Long Term Evolution (LTE), electronic mail (e-mail), and Short Messaging Service (SMS).

The memory 120 may be configured to store a software program and a module. The processor 180 runs the software program and the module stored in the memory 120 to perform various functional applications and data processing. The memory 120 may mainly include a program storage area and a data storage area. The program storage area may store an operating system, an application program required by at least one function (such as a sound playback function and an image display function), and the like. The data storage area may store data (such as audio frequency data and an address book) created based on use of the node device 300, and the like. In addition, the memory 120 may include a high speed random access memory (RAM), and may further include a non-volatile memory, such as at least one magnetic disk storage device, a flash memory, or another solid-state storage device. Correspondingly, the memory 120 may further include a memory controller to provide access of the processor 180 and the input unit 130 to the memory 120.

The input unit 130 may be configured to receive input digit or character information, and generate a keyboard, mouse, joystick, optical, or track ball signal input related to user setting and function control. Further, the input unit 130 may include a touch-sensitive surface 131 and an input device 132. The touch-sensitive surface 131, which may also be referred to as a touch display screen or a touch control board, may collect a touch operation of a user on or near the touch-sensitive surface (such as an operation of a user on or near the touch-sensitive surface 131 using any suitable object or accessory such as a finger or a stylus), and drive a corresponding connection apparatus according to a preset program. Optionally, the touch-sensitive surface 131 may include two parts a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented using a type such as a resistive, capacitive, infrared, or surface sound wave type. In addition to the touch-sensitive surface 131, the input unit 130 may further include the input device 132. Further, the input device 132 may include, but is not limited to, one or more of a physical keyboard, a functional key (such as a volume control key or a switch key), a trackball, a mouse, and a joystick.

The display unit 140 may be configured to display information input by the user or information provided to the user, and various graphical user interfaces of the node device 300, and these graphical user interfaces may be constituted by an image, a text, an icon, a video, and any combination thereof. The display unit 140 may include a display panel 141. Optionally, the display panel 141 may be configured using a liquid crystal display (LCD), an organic light-emitting diode (OLED), or the like. Further, the touch panel 131 may cover the display panel 141. After detecting a touch operation on or near the touch panel 131, the touch panel 131 transfers the touch operation to the processor 180 to determine a type of a touch event. The processor 180 then provides a corresponding visual output on the display panel 141 based on the type of the touch event. Although, in FIG. 3, the touch-sensitive surface 131 and the display panel 141 are used as two separate parts to implement input and output functions, in some embodiments, the touch-sensitive surface 131 and the display panel 141 may be integrated to implement the input and output functions.

The node device 300 may further include at least one sensor 150 such as an optical sensor, a motion sensor, and another sensor. Further, the optical sensor may include an ambient light sensor and a proximity sensor. The ambient light sensor may adjust luminance of the display panel 141 based on brightness of the ambient light. The proximity sensor may switch off the display panel 141 and/or backlight when the node device 300 is moved to an ear. As one type of motion sensor, a gravity acceleration sensor may detect magnitude of accelerations in various directions (usually on three axes), may detect magnitude and a direction of the gravity when static, and may be applied to an application that recognizes the attitude of a mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor may be configured in the node device 300, and details are not described herein.

The audio circuit 160, a speaker 161, and a microphone 162 may provide audio interfaces between the user and the node device 300. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another node device using the RF circuit 110, or outputs the audio data to the memory 120 for further processing. The audio circuit 160 may further include an earplug jack, to provide communication between a peripheral earphone and the node device 300.

WI-FI is a short distance wireless transmission technology. The node device 300 may help, using the WI-FI module 170, the user receive and send emails, browse a web page, access streaming media, and the like, to provide wireless broadband Internet access for the user. Although FIG. 3 shows the WI-FI module 170, it may be understood that the WI-FI module 170 is not a necessary component of the node device 300, and when required, the WI-FI module 170 may be omitted as long as the scope of the essence of the present disclosure is not changed.

The processor 180 is a control center of the node device 300, and is connected to various parts of the mobile phone using various interfaces and lines. By running or executing the software program and/or the module stored in the memory 120, and invoking data stored in the memory 120, the processor 180 performs various functions and data processing of the node device 300, thereby performing overall monitoring on the mobile phone. Optionally, the processor 180 may include one or more processing cores. Optionally, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The node device 300 further includes the power supply 190 (such as a battery) for supplying power to the components. The power supply may be logically connected to the processor 180 using a power management system, thereby implementing functions such as charging, discharging, and power consumption management using the power management system. The power supply 190 may further include one or more of a direct current or alternating current power supply, a re-charging system, a power failure detection circuit, a power supply converter or inverter, a power supply state indicator, and any other component.

Although not shown in the figure, the node device 300 may further include a camera, a BLUETOOTH module, and the like, and details are not described herein. Further, in this embodiment, the display unit of the node device is a touchscreen display, and the node device further includes a memory and an executable instruction. The executable instruction is stored in the memory and configured to be executed by the one or more processors. The executable instruction is used to perform a method at a node device side in the following embodiment shown in FIG. 4.

In an example of an embodiment, a computer readable storage medium such as a memory storing an executable instruction is provided. The executable instruction may be loaded and executed by a processor to implement an image distribution method in the following embodiment shown in FIG. 4. For example, the computer readable storage medium may be a read-only memory (ROM), a RAM, a compact disc (CD) ROM (CD-ROM), a magnetic tape, a FLOPPY DISK, an optical data storage device, and the like.

Figure 4:
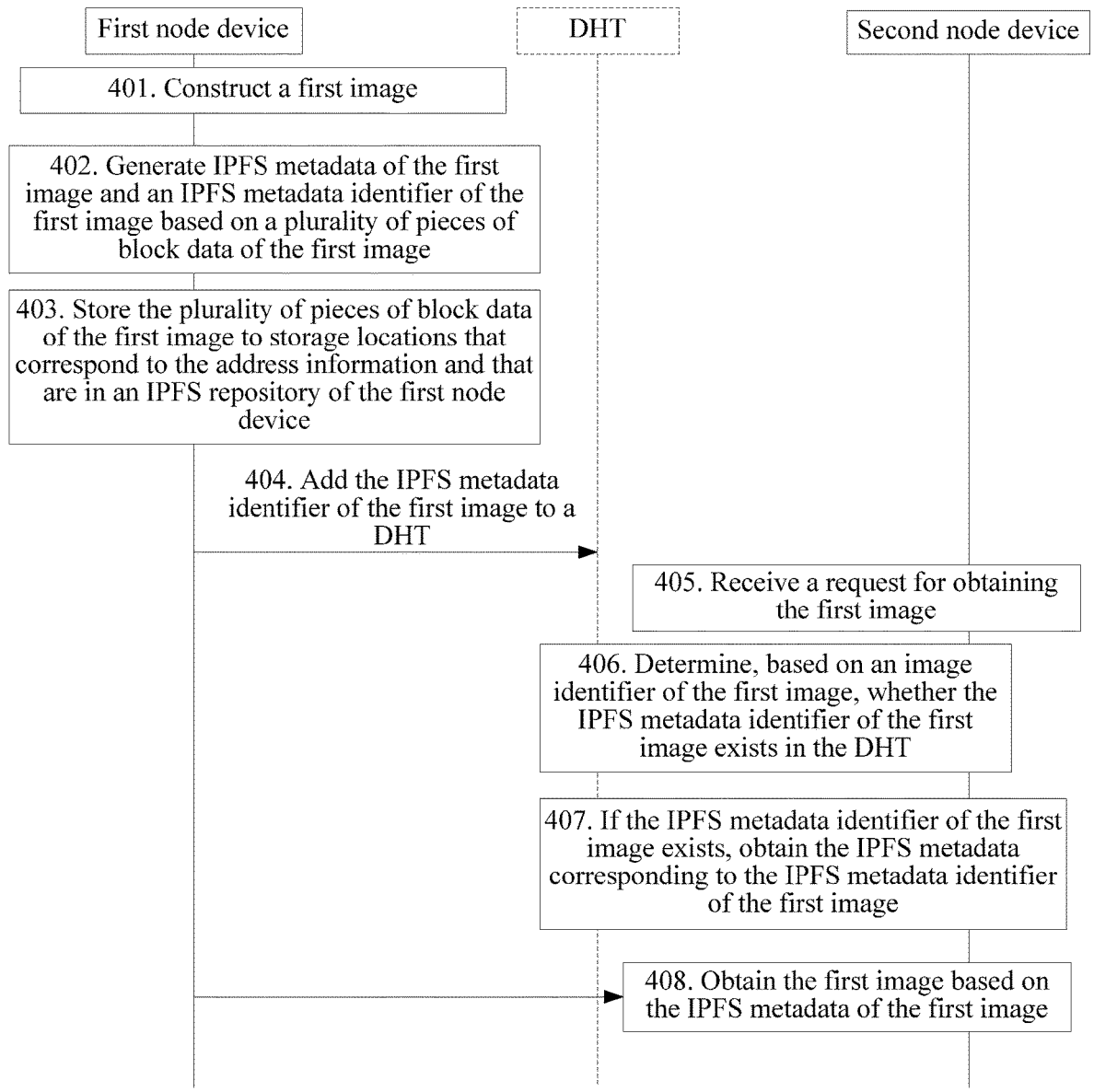
FIG. 4 is a schematic flowchart of an image distribution method according to an embodiment of the present disclosure.

FIG. 4 is a schematic flowchart of an image distribution method according to an embodiment of the present disclosure. The image distribution method is applied to a distributed file system. The distributed file system includes at least two node devices. In this embodiment of the present disclosure, a first node device and a second node device are used as an example. Referring to FIG. 4, the image distribution method may include the following steps.

Step 401. The first node device constructs a first image.

The first node device may be any node device in the distributed file system, and the first node device may construct a new image during running. The new image is the first image in step 401. Image data of the first image may include a form file, a configuration file, and an image layer file. The form file (manifest) is used to record information about the configuration file and the image layer file of the first image. The configuration file is used to record information when the first image is running and a dependence relationship between image layers. The image layer file (layers) is application data of the first image, and a set of image layers form the entire first image. All the foregoing image data of the first image may be used as block data of the first image for processing.

Figure 5:
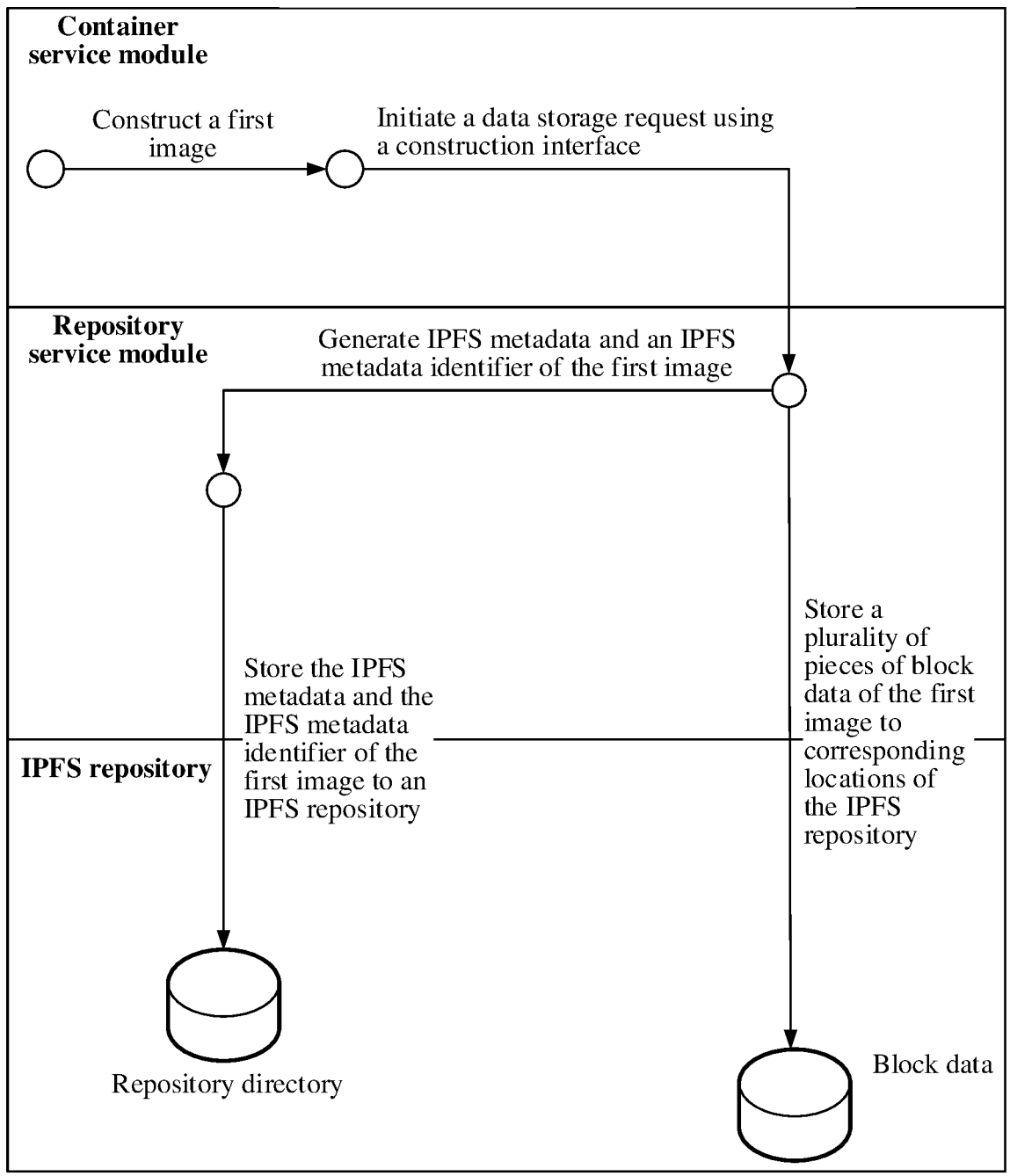
FIG. 5 is a schematic diagram of an image construction process according to an embodiment of the present disclosure.

It should be noted that the construction of the first image may be actually implemented by a container service module in the first node device. Referring to FIG. 5, after constructing the first image, the container service module may initiate a data storage request using a construction interface to request to store a plurality of pieces of block data of the first image to an IPFS repository.

In this embodiment of the present disclosure, after constructing the first image, if the first node device does not publish the first image, the first image can be used by only the first node device. Therefore, to enable another node device in the distributed file system to obtain the first image constructed by the first node device, the first node device may publish the first image to the distributed file system. However, it is considered that a data volume of the plurality of pieces of block data of the first image is relatively large. To reduce a volume of to-be-published data, the first node device may generate a small volume of related data based on the plurality of pieces of block data of the first image, and publish the related data to the distributed file system such that the other node device may obtain the first image based on the related data.

Step 402. The first node device generates IPFS metadata of the first image and an IPFS metadata identifier of the first image based on a plurality of pieces of block data of the first image, where the IPFS metadata of the first image includes an image identifier of the first image, a name of the first node device, and names and address information of the plurality of pieces of block data of the first image, and the IPFS metadata identifier of the first image is used to index the IPFS metadata of the first image.

The image identifier may be an image name, an image number, and the like. For example, the image name may be an image file name or an image file name abbreviation, and the image number may be a character string including letters, digits, or the like.

In this embodiment of the present disclosure, there is a specified data structure organization specification, such as a Merkle database availability group (DAG) specification, for the IPFS repository. To ensure that the related data generated by the first node device based on the plurality of pieces of block data of the first image conforms to the data structure organization specification for the IPFS repository, a process of generating the related data may include the following. The first node device may organize the plurality of pieces of block data of the first image based on a Merkle DAG algorithm to generate IPFS metadata of the first image that conforms to the data structure organization specification for the IPFS repository, and use the IPFS metadata of the first image as the related data. The IPFS metadata may be used to describe an IPFS object.

In addition, the IPFS repository manages IPFS metadata of an image in a one-to-one correspondence manner between an IPFS metadata identifier and the IPFS metadata. Therefore, when generating the IPFS metadata of the first image, the first node device may further generate the IPFS metadata identifier of the first image. In a possible implementation, the first node device may perform image service-customized encoding and hash encoding on the image identifier of the first image to obtain the IPFS metadata identifier of the first image.

The address information of the plurality of pieces of block data that is included in the IPFS metadata of the first image may be indirect address information, for example, hash values of the plurality of pieces of block data. The hash values of the plurality of pieces of block data may be generated in a process of constructing the first image. For each block data of the first image, a storage location of the block data in the first node device may be determined based on the hash value of the block data.

This embodiment of the present disclosure is described using an example in which the IPFS metadata of the first image includes the image identifier of the first image, the name of the first node device, and the names and the address information of the plurality of pieces of block data of the first image. Actually, the IPFS metadata of the first image may further include version information of the first image.

It should be noted that, referring to FIG. 5, the generation of the IPFS metadata and the IPFS metadata identifier of the first image may be actually implemented by a repository service module in the first node device. That is, after receiving the data storage request initiated by the container service module, the repository service module may generate the IPFS metadata of the first image and the IPFS metadata identifier of the first image based on the plurality of pieces of block data of the first image.

Step 403. The first node device stores the plurality of pieces of block data of the first image to storage locations that correspond to the address information and that are in an IPFS repository of the first node device.

In this embodiment of the present disclosure, for the plurality of pieces of block data of the first image, the first node device may store the plurality of pieces of block data to the storage locations that correspond to the address information of the plurality of pieces of block data and that are in the IPFS repository of the first node device. In a possible implementation, for each block data, the first node device may determine the storage location of the block data in the first node device based on the hash value of the block data.

In addition to storing the plurality of pieces of block data of the first image, the first node device may also store the IPFS metadata and the IPFS metadata identifier of the first image. For example, the first node device may store, based on a local database organization principle, the IPFS metadata and the IPFS metadata identifier to a segment of local storage space that an IPFS service can access. In a possible implementation, the first node device may store the IPFS metadata and the IPFS metadata identifier to a correspondence record table. For example, the IPFS repository of the first node device may maintain a correspondence record table, and the correspondence record table is used to record a correspondence between an IPFS metadata identifier and IPFS metadata of an image.

For that the IPFS metadata of the first image may further include version information of the first image in step 402, step 403 may include determining, by the first node device based on the image identifier of the first image, whether a second image exists in the IPFS repository of the first node device, where an image identifier of the second image is the same as the image identifier of the first image, and storing the plurality of pieces of block data of the first image to the storage locations that correspond to the address information and that are in the IPFS repository of the first node device if the second image exists and version information of the second image is different from the version information of the first image. The first node device may store a first image of a new version to the IPFS repository of the first node device, thereby updating a version of an image having a same name as the first image of the new version.

It should be noted that, storage of the IPFS metadata of the first image, the plurality of pieces of block data of the first image, and the IPFS metadata identifier of the first image may be actually implemented by the repository service module in the first node device.

Step 401 to step 403 is a process of constructing the first image and storing the first image by the first node device.

Step 404. The first node device adds the IPFS metadata identifier of the first image to a DHT of the distributed file system, where the DHT includes IPFS metadata identifiers of images published by a plurality of node devices in the distributed file system.

In this embodiment of the present disclosure, after constructing and storing the first image, the first node device may publish the IPFS metadata of the first image or the first image to the distributed file system by adding the IPFS metadata identifier of the first image to the DHT such that when needing to obtain the first image, another node device may obtain the IPFS metadata of the first image that corresponds to the IPFS metadata identifier of the first image using the IPFS metadata identifier of the first image in the DHT to obtain the entire first image.

It should be noted that step 404 may be actually performed by the repository service module in the first node device. Correspondingly, step 404 may include the following steps a and b.

Step a. Receive a publication request for the first image, where the publication request carries the image identifier of the first image.

Figure 6:
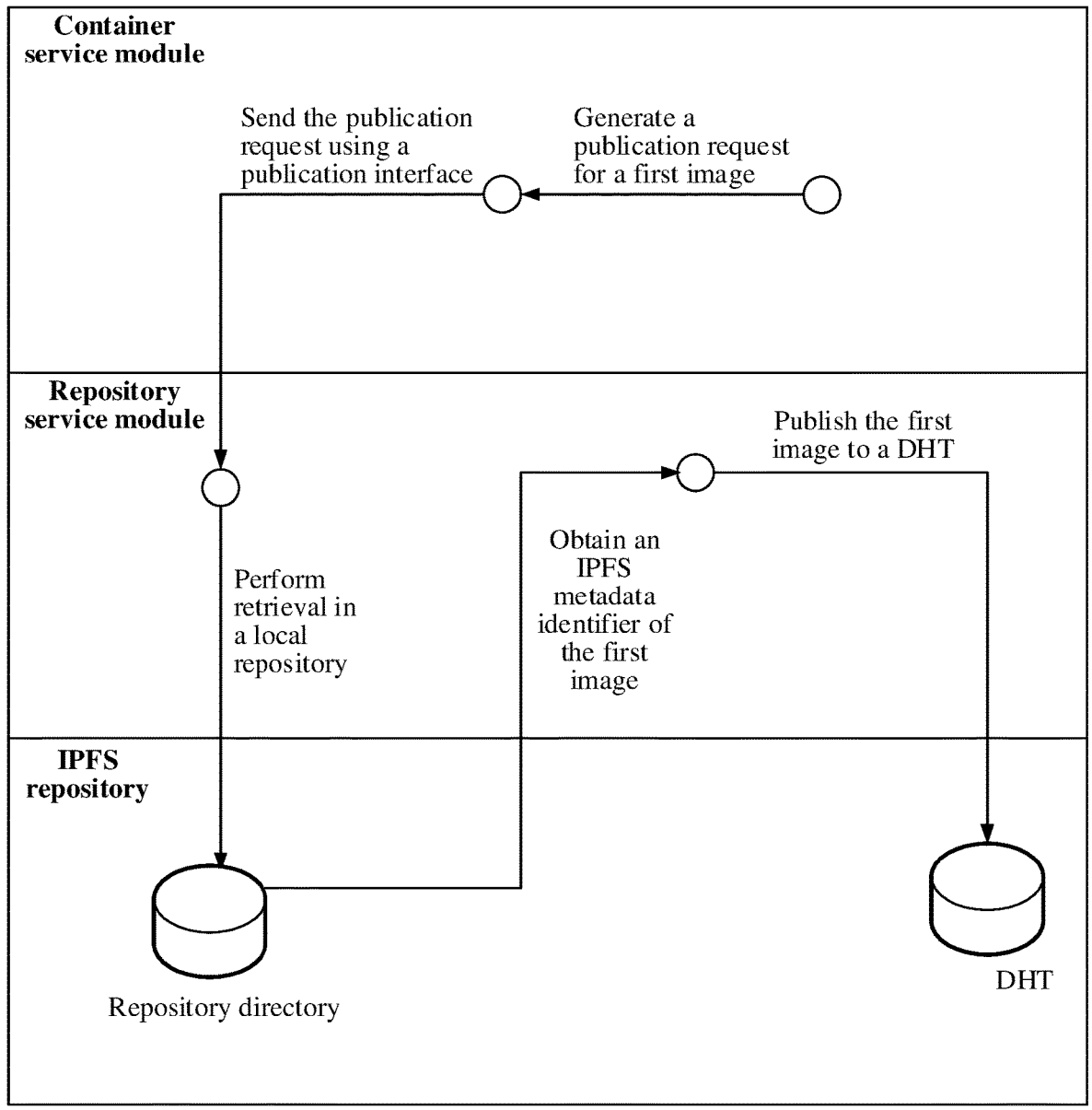
FIG. 6 is a schematic diagram of an image publication process according to an embodiment of the present disclosure.

In this embodiment of the present disclosure, referring to FIG. 6, the container service module in the first node device may generate the publication request for the first image, and send the publication request for the first image to the repository service module using a publication interface of the container service module, and the repository service module receives the publication request.

Step b. Obtain, based on the image identifier of the first image, the IPFS metadata identifier of the first image corresponding to the IPFS metadata of the first image from local storage space of the first node device, and add the IPFS metadata identifier of the first image to the DHT.

In this embodiment of the present disclosure, the first node device locally stores the IPFS metadata of the first image and the corresponding IPFS metadata identifier. The IPFS metadata of the first image includes the image identifier of the first image. The first node device may find, based on the image identifier of the first image, the IPFS metadata of the first image that includes the image identifier of the first image, to obtain the IPFS metadata identifier of the first image. For example, the first node device may obtain the IPFS metadata identifier of the first image that corresponds to the IPFS metadata of the first image from the correspondence record table.

Referring to FIG. 6, after receiving the publication request for the first image, the repository service module may perform local retrieval in the node device based on the image identifier of the first image that is carried in the publication request, obtain the IPFS metadata identifier of the first image from the first node device, and publish the first image by adding the IPFS metadata identifier of the first image to the DHT. In addition, after storing the IPFS metadata identifier of the first image, the DHT may send a publication success message to the first node device to inform the first node device that the first image is successfully published.

In this embodiment of the present disclosure, the first node device publishes the IPFS metadata of the first image or the first image by adding the IPFS metadata identifier of the first image to the DHT such that another node may retrieve and obtain the IPFS metadata of the first image using the IPFS metadata identifier, to obtain the entire first image. The block data of the first image does not need to be published such that a volume of transmitted image data can be reduced and storage space utilization can be improved, thereby reducing overheads of an entire system.

Step 401 to step 404 is a process of constructing, storing, and publishing the image by the first node device. If the first node device does not publish the image after constructing the image, the image can be used by only the first node device. However, after the IPFS metadata identifier of the image is published to the DHT, another node may obtain the IPFS metadata of the image based on the IPFS metadata identifier of the image in the DHT, and then obtain the entire image based on the IPFS metadata.

Step 405. The second node device receives a request for obtaining the first image, where the obtaining request carries the image identifier of the first image.

Figure 7:
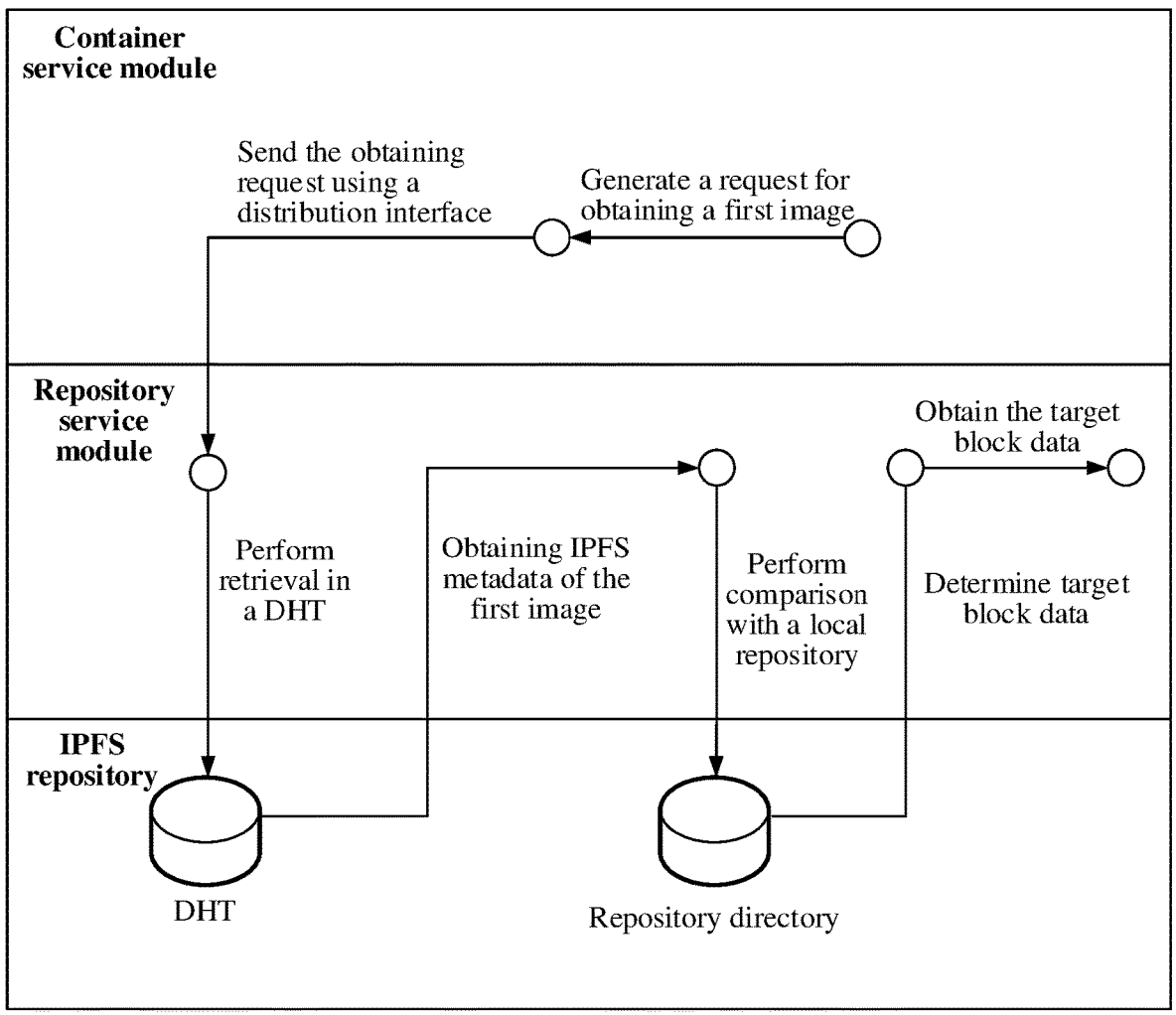
FIG. 7 is a schematic diagram of an image distribution process according to an embodiment of the present disclosure.

In this embodiment of the present disclosure, referring to FIG. 7, a container service module in the second node device may generate the request for obtaining the first image, and send the request for obtaining the first image to a repository service module in the second node device using a distribution interface of the container service module, and the repository service module receives the obtaining request.

Step 406. The second node device determines, based on the image identifier of the first image, whether the IPFS metadata identifier of the first image exists in the DHT, where the IPFS metadata identifier of the first image is used to index the IPFS metadata of the first image.

In this embodiment of the present disclosure, for that the first node device may perform image service-customized encoding and hash encoding on the image identifier of the first image to obtain the IPFS metadata identifier of the first image in step 402, step 406 may correspondingly include performing, by the second node device, image service-customized encoding and hash encoding on the image identifier of the first image to obtain the IPFS metadata identifier of the first image, and determining, by the second node device, whether the IPFS metadata identifier of the first image exists in the DHT.

Determining, by the second node device, whether the IPFS metadata identifier of the first image exists in the DHT may include sending, by the repository service module in the second node device, a query request to the DHT to query whether the IPFS metadata identifier of the first image exists in the DHT, where the query request carries the IPFS metadata identifier of the first image such that the DHT returns a query result, for example, the IPFS metadata identifier of the first image exists or the IPFS metadata identifier of the first image does not exist.

The second node device may obtain the IPFS metadata identifier of the first image through the image service-customized encoding and the hash encoding based on a rule that the first node device generates the IPFS metadata identifier, to determine, based on the result for querying the IPFS metadata identifier of the first image by the DHT, whether the IPFS metadata identifier of the first image exists in the DHT such that a manner of determining, based on the image identifier of the first image, whether the IPFS metadata identifier of the first image exists in the DHT is provided.

Step 407. If the IPFS metadata identifier of the first image exists, the second node device obtains the IPFS metadata corresponding to the IPFS metadata identifier of the first image.

In this embodiment of the present disclosure, referring to FIG. 7, if the query result is that the IPFS metadata identifier of the first image exists in the DHT, step 407 may include that the repository service module in the second node device may send an obtaining request to the DHT to obtain the IPFS metadata corresponding to the IPFS metadata identifier, where the obtaining request carries the IPFS metadata identifier of the first image. The DHT queries and obtains, based on the IPFS metadata identifier of the first image that is carried in the obtaining request and a specified query mechanism, the IPFS metadata corresponding to the IPFS metadata identifier of the first image from the plurality of node devices in the distributed file system, and returns a request result to the second node device. The request result carries the IPFS metadata of the first image. After receiving the IPFS metadata of the first image, the second node device may store the IPFS metadata of the first image to the second node device. For example, the DHT may query, based on a nearest node principle, the IPFS metadata of the first image using a query optimization algorithm such as a mainline DHT algorithm.

This embodiment of the present disclosure is described using an example in which the query result is that the IPFS metadata identifier of the first image exists in the DHT. If the query result is that the IPFS metadata identifier of the first image does not exist in the DHT, it indicates that the IPFS metadata of the first image does not exist in the distributed file system, that is, it indicates that the first image does not exist in the distributed file system. Therefore, the second node device may construct the first image by the second node device. The construction is similar to the construction of the first image by the first node device in step 401.

Step 408. The second node device obtains the first image based on the IPFS metadata of the first image.

In this embodiment of the present disclosure, step 408 may be implemented in the following two manners.

A first manner: The second node device may obtain, based on a name of a node device in which the first image is located and address information of a plurality of pieces of block data of the first image, the plurality of pieces of block data of the first image from the node device in which the first image is located, where the name and the address information are included in the IPFS metadata of the first image, and obtain the entire first image to the second node device based on the plurality of pieces of block data of the first image.

In this embodiment of the present disclosure, the node device in which the first image is located may be the first node device. This manner is for a case in which the second node device obtains all block data of the first image. After obtaining the IPFS metadata of the first image, the second node device may obtain all the block data of the first image from the first node device based on the IPFS metadata of the first image. Using particular block data as an example, the second node device may obtain a storage location of the block data in the first node device by performing a hash operation based on the address information, such as a hash value, of the block data using the hash value to obtain the block data from the storage location. For example, the second node device may obtain the block data from the storage location in the first node device based on the Bit Torrent Protocol.

A second manner: The second node device may determine target block data based on names of a plurality of pieces of block data of the first image that are included in the IPFS metadata of the first image, obtain, based on a name of a node device in which the first image is located and address information of the target block data that are included in the IPFS metadata of the first image, the target block data from the node device in which the first image is located, and obtain the first image based on the target block data and block data of the first image that exists in an IPFS repository of the second node device, where the target block data is block data that is in the plurality of pieces of block data of the first image and that does not exist in the IPFS repository of the second node device.

This manner is for a case in which the second node device obtains a part of block data of the first image. Referring to FIG. 7, after obtaining the IPFS metadata of the first image, the second node device may determine the target block data by comparing the names of the plurality of pieces of block data that are included in the IPFS metadata of the first image with names of a plurality of pieces of block data in the IPFS repository of the second node device. For example, if the plurality of pieces of block data included in the IPFS metadata of the first image are block data A, block data B, and block data C, and the plurality of pieces of block data in the IPFS repository of the second node device are the block data A, block data D, and block data E, it may be determined that the target block data is the block data B and the block data C.

After determining the target block data, the second node device may obtain the target block data from a corresponding node device, and then obtain the first image based on the target block data and the other part of block data of the first image that exists in the IPFS repository of the second node device. For example, the second node device may obtain the entire first image based on the obtained block data B, block data C, and the existing block data A.

The second node device may obtain all the block data of the first image from another node device based on the IPFS metadata of the first image, and obtain the first image based on all the block data, or may obtain a part of block data of the first image from another node device, and obtain the first image based on the part of the block data and the other part of the block data that has already been stored in the second node device such that a plurality of manners of obtaining the first image based on the IPFS metadata of the first image are provided.

Step 405 to step 408 is a process of obtaining the first image by the second node device.

The image distribution and obtaining method provided in the embodiments of the present disclosure may further include image construction (referring to FIG. 5), image publication (referring to FIG. 6), and image obtaining (referring to FIG. 7). In the system provided in the embodiments of the present disclosure, block data of each image is distributed at each node, and each node only needs to publish a metadata identifier corresponding to metadata of its own image such that a volume of transmitted image data can be reduced and storage space utilization is improved, thereby reducing overheads of the entire system.

Figure 8:
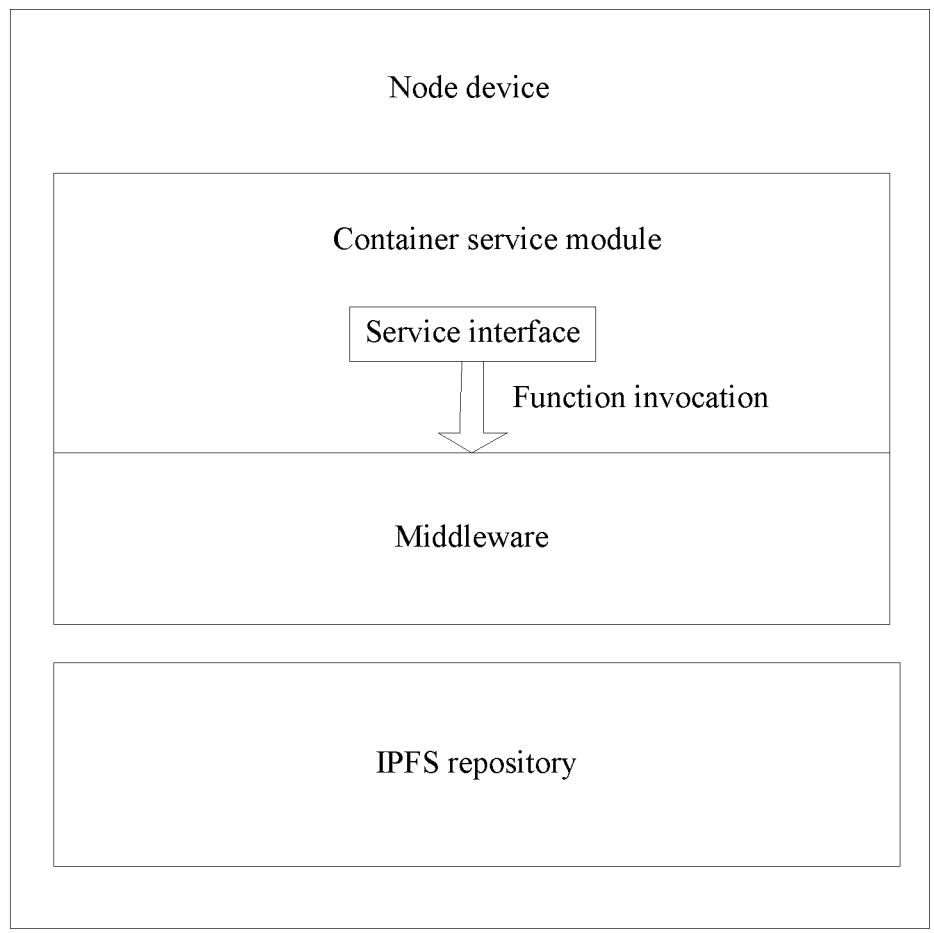
FIG. 8 is a schematic structural diagram of a node device according to an embodiment of the present disclosure.

It should be noted that in the embodiments of the present disclosure, the repository service module is implemented in an independent service manner. Furthermore, referring to FIG. 8, if a service interface such as an image construction interface, an image publication interface, or an image distribution interface of the container service module supports addition of middleware, the repository service module may alternatively be middleware of the container service module, that is, a service provided by the repository service module is implemented by directly invoking a function in the container service module. Using step 402 as an example, generation of the IPFS metadata and the IPFS metadata identifier of the first image may be actually implemented by invoking a specified function by the container service module.

According to the method provided in the embodiments of the present disclosure, the first node device may locally construct and store the image without depending on a central repository server, then generate the IPFS metadata identifier corresponding to the IPFS metadata of the image based on the plurality of pieces of block data of the image, and publish the image by adding the IPFS metadata identifier to the DHT. The second node device may proactively initiate the request for obtaining the first image, obtain, based on the DHT, the IPFS metadata corresponding to the IPFS metadata identifier of the first image, and obtain, based on the IPFS metadata of the first image, the image from the first node device to the second node device. The entire process may be performed between node devices without control of another device such that efficiency is high.

Figure 9:
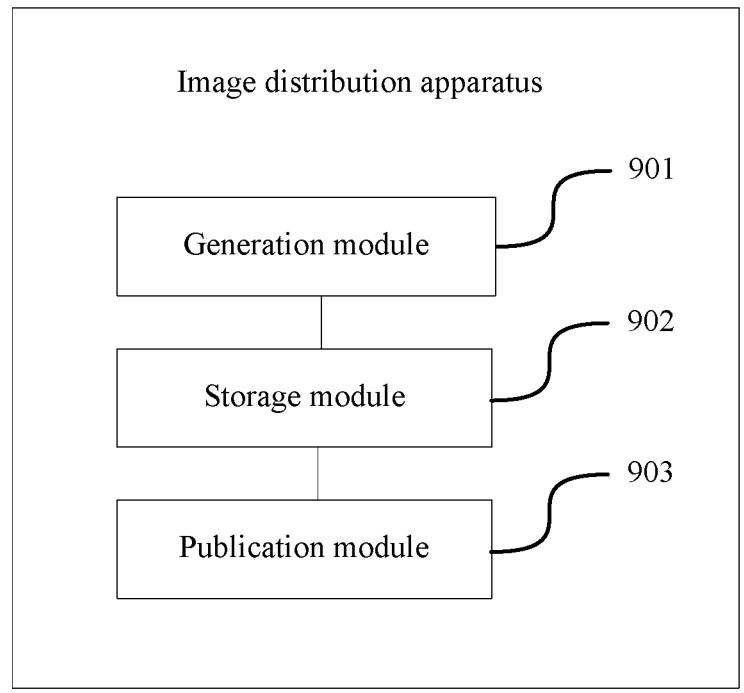
FIG. 9 is a schematic structural diagram of an image distribution apparatus according to an embodiment of the present disclosure.

FIG. 9 is a schematic structural diagram of an image distribution apparatus according to an embodiment of the present disclosure. Referring to FIG. 9, the apparatus includes a generation module 901, a storage module 902, and a publication module 903.

The generation module 901 is configured to generate IPFS metadata of a first image and an IPFS metadata identifier of the first image based on a plurality of pieces of block data of the first image. The IPFS metadata of the first image includes an image identifier of the first image, a name of the node device, and names and address information of the plurality of pieces of block data of the first image. The IPFS metadata identifier of the first image is used to index the IPFS metadata of the first image.

The storage module 902 is configured to store the plurality of pieces of block data of the first image to storage locations that correspond to the address information and that are in an IPFS repository of the node device.

The publication module 903 is configured to add the IPFS metadata identifier of the first image to a DHT of a distributed file system. The DHT includes IPFS metadata identifiers of images published by a plurality of node devices in the distributed file system.

In a possible implementation, the publication module 903 is configured to perform a process of adding the IPFS metadata identifier of the first image to the DHT in step 404.

Figure 10:
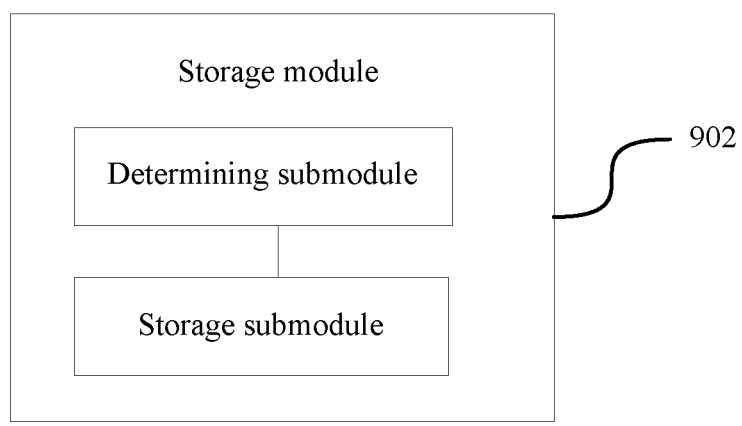
FIG. 10 is a schematic structural diagram of a storage module 902 according to an embodiment of the present disclosure.

In a possible implementation, referring to FIG. 10, the storage module 902 includes a determining submodule configured to perform a process of determining whether the second image whose image identifier is the same as that of the first image exists in the IPFS repository of the node device in step 403, and a storage submodule configured to perform a process of storing the plurality of pieces of block data of the first image to the IPFS repository in step 403.

In a possible implementation, the generation module is configured to perform a process of generating the IPFS metadata identifier of the first image in step 402.

In this embodiment of the present disclosure, the node device may locally construct and store the image without depending on a central repository server, then generate the IPFS metadata identifier corresponding to the IPFS metadata of the image based on the plurality of pieces of block data of the image, and publish the image by adding the IPFS metadata identifier to the DHT such that another node device may obtain, based on the DHT, the image published by the node device. The entire process may be performed between node devices without control of another device such that efficiency is high.

It should be noted that, division of the foregoing functional modules is only described as an example during image distribution of the image distribution apparatus provided in the foregoing embodiment. In an actual application, the foregoing functions may be allocated, based on a requirement, to be implemented by different functional modules, that is, an internal structure of the device is divided into different functional modules to implement all or some of the foregoing described functions. In addition, the image distribution apparatus provided in the foregoing embodiment and the image distribution method embodiments belong to a same concept. For a specific implementation process of the apparatus, refer to the method embodiments, and details are not described herein again.

In an example of an embodiment, a non-transitory computer readable storage medium including an instruction, for example, a memory including an instruction, is further provided. The instruction may be executed by an image distribution apparatus to implement the image distribution method in the foregoing embodiments. For example, the non-transitory computer readable storage medium may be a ROM, a RAM, a CD-ROM, a magnetic tape, a FLOPPY DISK, an optical data storage device, or the like.

Figure 11:
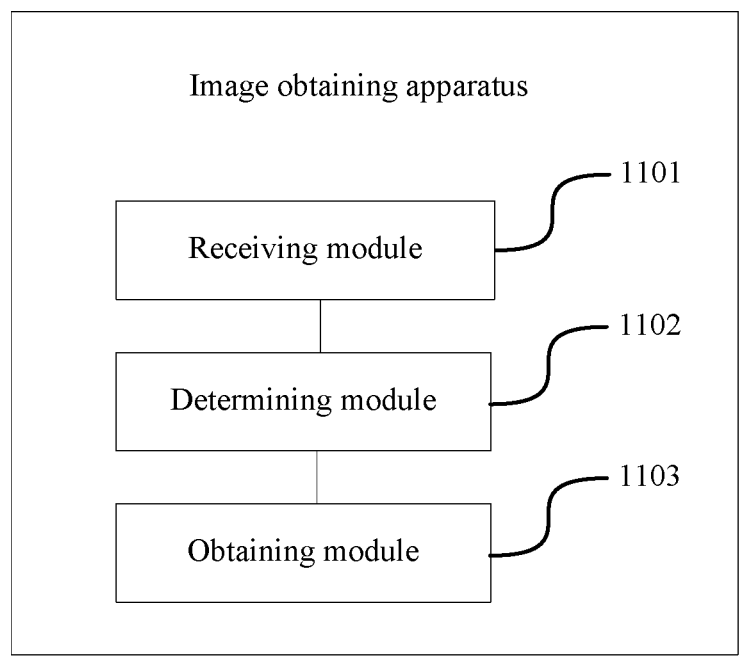
FIG. 11 is a schematic structural diagram of an image obtaining apparatus according to an embodiment of the present disclosure.

FIG. 11 is a schematic structural diagram of an image obtaining apparatus according to an embodiment of the present disclosure. Referring to FIG. 11, the apparatus includes a receiving module 1101, a determining module 1102, and an obtaining module 1103.

The receiving module 1101 is configured to receive a request for obtaining a first image. The obtaining request carries an image identifier of the first image.

The determining module 1102 is configured to determine, based on the image identifier of the first image, whether an IPFS metadata identifier of the first image exists in a DHT, where the DHT includes IPFS metadata identifiers of images published by a plurality of node devices in a distributed file system.

The obtaining module 1103 is configured to obtain IPFS metadata corresponding to the IPFS metadata identifier of the first image, and obtain the first image based on the IPFS metadata of the first image if the IPFS metadata identifier of the first image exists.

In a possible implementation, the determining module 1102 is configured to perform a process of determining whether the IPFS metadata identifier of the first image exists in the DHT in step 406.

In a possible implementation, the obtaining module 1103 is configured to perform a process of obtaining the IPFS metadata of the first image in step 407.

In a possible implementation, the obtaining module 1103 is configured to perform a process of obtaining the first image based on all the block data of the first image that is obtained by the other node device in step 408, or the obtaining module 1103 is configured to perform a process of obtaining the first image based on the part of the block data of the first image that is obtained from the other node device and the block data that exists in the node device in step 408.

In this embodiment of the present disclosure, a node device may proactively initiate the request for obtaining the image, obtain, based on the DHT, the IPFS metadata corresponding to the IPFS metadata identifier of the first image, and obtain, based on the IPFS metadata, the first image to the node device from a node device that publishes the first image. The obtaining of the image may be triggered by proactively initiating the obtaining request by the node device, and the obtaining of the image may be performed between node devices without control of another device such that efficiency is high.

It should be noted that, division of the foregoing functional modules is only described as an example during image obtaining of the image obtaining apparatus provided in the foregoing embodiment. In an actual application, the foregoing functions may be allocated, based on a requirement, to be implemented by different functional modules, that is, an internal structure of the device is divided into different functional modules to implement all or some of the foregoing described functions. In addition, the image obtaining apparatus provided in the foregoing embodiment and the image obtaining method embodiments belong to a same concept. For a specific implementation process of the apparatus, refer to the method embodiments, and details are not described herein again.

In an example of an embodiment, a non-transitory computer readable storage medium including an instruction, for example, a memory including an instruction, is further provided. The instruction may be executed by an image obtaining apparatus to implement the image obtaining method in the foregoing embodiments. For example, the non-transitory computer readable storage medium may be a ROM, a RAM, a CD-ROM, a tape, a FLOPPY DISK, an optical data storage device, or the like.

A person of ordinary skill in the art may understand that all or some of the steps of the embodiments may be implemented using hardware or a program instructing related hardware. The program may be stored in a computer readable storage medium. The storage medium may be a ROM, a magnetic disk, an optical disc, or the like.

The foregoing descriptions are merely optional embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. An image distribution method, applied to a node device in a distributed file system, comprising:
   generating interplanetary file system (IPFS) metadata of a first image, wherein generating the IPES metadata comprises organizing pieces of block data of the first image based on a Merkle database availability group (DAG) algorithm, and wherein the IPFS metadata comprises a first image identifier, first image version information, a name of the node device, and names and address information of the pieces of block data;
   generating an IPFS metadata identifier of the first image based on a plurality of pieces of block data of the first image, and wherein generating the IPFS metadata identifier comprises performing image service-customized encoding and hash encoding on the first image identifier to obtain the IPFS metadata identifier, and wherein the IPFS metadata identifier indexes the IPFS metadata;
   comparing the IPFS metadata identifier of the image with IPFS metadata identifiers in a distributed hash table (DHT), wherein the DHT comprises IPFS metadata identifiers of images published by a plurality of node devices in the distributed file system;
   storing the pieces of block data in storage locations corresponding to the address information in an IPFS repository of the node device; and
   adding the IPFS metadata identifier to the DHT.

2. The image distribution method of claim 1, wherein adding the IPFS metadata identifier to the DHT comprises:
   receiving a publication request for the first image, wherein the publication request carries the first image identifier;
   obtaining the IPFS metadata identifier based on the first image identifier; and
   adding the IPFS metadata identifier to the DHT.

3. The image distribution method of claim 1, wherein the IPFS metadata further comprises first version information of the first image, and wherein storing the pieces of block data comprises:
   determining, based on the first image identifier, whether a second image exists in the IPFS repository, wherein a second image identifier of the second image is the same as the first image identifier; and
   storing the pieces of block data in the storage locations when the second image exists and second version information of the second image is different from the first version information.

4. An image obtaining method, applied to a first node device in a distributed file system, comprising:
   receiving a first obtaining request for an image, wherein the first obtaining request carries an image identifier of the image;
   performing image service-customized encoding and hash encoding on the image identifier-to obtain an interplanetary file system (IPFS) metadata identifier of the image;
   comparing the IPFS metadata identifier of the image with IPFS metadata identifiers in a distributed hash table (DHT), wherein the DHT comprises IPFS metadata identifiers of images published by a plurality of node devices in the distributed file system, and wherein an IPFS metadata identifier indexes IPFS metadata of the image;
   obtaining the IPFS metadata corresponding to the IPFS metadata identifier of the image when the IPFS metadata identifier of the image exists in the DHT, wherein the IPFS metadata comprises pieces of block data arranged based on a Merkle database availability group (DAG) algorithm; and
   obtaining the image based on the IPFS metadata.

5. The image obtaining method of claim 4, wherein obtaining the IPFS metadata comprises:
   sending a second obtaining request to the DHT, wherein the second obtaining request instructs the DHT to obtain the IPFS metadata from the node devices; and
   receiving a request result from the DHT, wherein the request result carries the IPFS metadata.

6. The image obtaining method of claim 4, wherein obtaining the image comprises:
   obtaining, based on a name of a second node device in which the image is located and address information of a plurality of pieces of block data of the image, the pieces of block data from the second node device, wherein the IPFS metadata comprises the name and the address information; and
   obtaining the image based on the pieces of block data.

7. A node device, in a distributed file system, comprising:
   a memory configured to store executable instructions; and
   a processor coupled to the memory, wherein when executed by the processor, the executable instructions cause the processor to be configured to:
   generate interplanetary file system (IPFS) metadata of a first image, wherein generating the IPES metadata comprises organizing pieces of block data of the first image based on a Merkle database availability group (DAG) algorithm, and wherein the IPFS metadata comprises a first image identifier, first image version information, a name of the node device, and names and address information of the pieces of block data;

generate an IPFS metadata identifier of the first image based on a plurality of pieces of block data of the first image, and wherein generating the IPFS metadata identifier comprises performing image service-customized encoding and hash encoding on the first image identifier to obtain the IPFS metadata identifier, and wherein the IPFS metadata identifier indexes the IPFS metadata;

compare the IPFS metadata identifier with IPFS metadata identifiers in a distributed hash table (DHT), wherein the DHT comprises IPFS metadata identifiers of images published by a plurality of node devices in the distributed file system;

determine whether the IPFS metadata identifier exists in the DHT;

store the pieces of block data in storage locations corresponding to the address information in an IPFS repository of the node device; and add the IPFS metadata identifier to the DHT.

8. The node device of claim 7, wherein the executable instructions further cause the processor to be configured to:

receive a publication request for the first image, wherein the publication request carries the first image identifier;

obtain the IPFS metadata identifier based on the first image identifier; and add the IPFS metadata identifier to the DHT.

9. The node device of claim 7, wherein the IPFS metadata further comprises first version information of the first image, and wherein the executable instructions further cause the processor to be configured to:

determine, based on the first image identifier, whether a second image exists in the IPFS repository, wherein a second image identifier of the second image is the same as the first image identifier; and store the pieces of block data in the storage locations when the second image exists and second version information of the second image is different from the first version information.

10. A first node device, in a distributed file system, comprising:

a memory configured to store executable instructions; and a processor coupled to the memory, wherein when executed, the executable instructions-cause the processor to be configured to:

receive a first obtaining request for an image, wherein the first obtaining request carries an image identifier of the image;

perform image service-customized encoding and hash encoding on the image identifier to obtain an interplanetary file system (IPFS) metadata identifier of the image;

compare the IPFS metadata identifier of the image with IPFS metadata identifiers in a distributed hash table (DHT), wherein the DHT comprises IPFS metadata identifiers of images published by a plurality of node devices in the distributed file system, and wherein the IPFS metadata identifier indexes IPFS metadata of the image;

obtain the IPFS metadata corresponding to the IPFS metadata identifier of the image when the IPFS metadata identifier of the image exists in the DHT, wherein the IPFS metadata comprises pieces of block data arranged based on a Merkle database availability group (DAG) algorithm; and obtain the image based on the IPFS metadata.

11. The first node device of claim 10, wherein the executable instructions further cause the processor to be configured to:

send a second obtaining request to the DHT requesting to obtain the IPFS metadata, wherein the second obtaining request enables the DHT to query and obtain the IPFS metadata from the node devices in the distributed file system; and receive a request result from the DHT, wherein the request result carries the IPFS metadata.

12. The first node device of claim 10, wherein the executable instructions further cause the processor to be configured to:

obtain, based on a name of a second node device in which the image is located and address information of a plurality of pieces of block data of the image, the pieces of block data from the second node device, wherein the IPFS metadata comprises the name and the address information; and obtain the image based on the pieces of block data.

13. The first node device of claim 10, wherein the executable instructions further cause the processor to be configured to:

determine target block data based on names of a plurality of pieces of block data of the image in the IPFS metadata;

obtain, based on a name of a second node device in which the image is located and address information of the target block data, the target block data from the second node device; and obtain the image based on the target block data and block data of the image that exists in an IPFS repository of the first node device, wherein the target block data is in the pieces of block data and does not exist in the IPFS repository.

14. The image obtaining method of claim 4, wherein obtaining the image comprises:

determining target block data based on names of a plurality of pieces of block data of the image in the IPFS metadata;

obtaining, based on a name of a second node device in which the image is located and address information of the target block data, the target block data from the second node device; and obtaining the image based on the target block data and block data of the image that exists in an IPFS repository of the first node device, wherein the target block data is in the pieces of block data and does not exist in the IPFS repository.

* * * * *

UNITED STATES PATENT AND TRADEMARK OFFICE
CERTIFICATE OF CORRECTION

PATENT NO. : 11,388,220 B2  
APPLICATION NO. : 16/589729  
DATED : July 12, 2022  
INVENTOR(S) : Keyang Xie Page 1 of 1

It is certified that error appears in the above-identified patent and that said Letters Patent is hereby corrected as shown below:

In the Claims

Claim 1, Column 19, Line 44: "the IPES metadata" should read "the IPFS metadata"

Claim 4, Column 20, Line 27: "identifier-to obtain" should read "identifier to obtain"

Claim 7, Column 20, Line 66: "the IPES metadata" should read "the IPFS metadata"

Claim 10, Column 21, Line 48: "instructions-cause the" should read "instructions cause the"

Signed and Sealed this  
Sixth Day of September, 2022

Katherine Kelly Vidal  
*Director of the United States Patent and Trademark Office*